United States Patent
Eldumiati et al.

(10) Patent No.: US 6,996,167 B2
(45) Date of Patent: Feb. 7, 2006

(54) MODEM IDENTIFICATION AND DIAGNOSTICS

(75) Inventors: Ismail Eldumiati, Irvine, CA (US); Dean Grumlose, Dana Point, CA (US); Jim W. Johnston, Santa Margarita, CA (US); Charles Raasch, Lake Forest, CA (US); Philippe Richard, Lake Forest, CA (US); Andy Webster, Irvine, CA (US); Joel Peshkin, San Juan Capistrano, CA (US); Mounir Ayoub, Orange, CA (US)

(73) Assignee: Mindspeed Technologies, Inc., Newport Beach, CA (US)

(*) Notice: Subject to any disclaimer, the term of this patent is extended or adjusted under 35 U.S.C. 154(b) by 942 days.

(21) Appl. No.: 09/824,448

(22) Filed: Apr. 1, 2001

(65) Prior Publication Data

US 2002/0012388 A1    Jan. 31, 2002

Related U.S. Application Data

(63) Continuation-in-part of application No. 09/662,405, filed on Sep. 14, 2000, now Pat. No. 6,980,590.

(60) Provisional application No. 60/153,897, filed on Sep. 14, 1999.

(51) Int. Cl.
*H04B 1/38* (2006.01)

(52) U.S. Cl. .................................................. 375/222

(58) Field of Classification Search ............... 375/219, 375/220, 222, 354, 224, 225, 227, 228; 325/500; 370/241, 250, 252; 379/1.01, 90.01; 324/500
See application file for complete search history.

(56) References Cited

U.S. PATENT DOCUMENTS

| | | | | |
|---|---|---|---|---|
| 5,208,812 A | * | 5/1993 | Dudek et al. | 370/280 |
| 5,311,596 A | * | 5/1994 | Scott et al. | 380/33 |
| 5,339,355 A | * | 8/1994 | Mori et al. | 370/294 |
| 5,619,725 A | * | 4/1997 | Gordon | 710/19 |
| 6,052,803 A | * | 4/2000 | Bhatia et al. | 714/49 |
| 6,233,543 B1 | * | 5/2001 | Butts et al. | 703/27 |
| 6,308,328 B1 | * | 10/2001 | Bowcutt et al. | 725/111 |
| 6,603,758 B1 | * | 8/2003 | Schmuelling et al. | 370/352 |
| 6,757,325 B1 | * | 6/2004 | Abdelilah et al. | 375/222 |
| 6,886,020 B1 | * | 4/2005 | Zahavi et al. | 707/204 |

* cited by examiner

*Primary Examiner*—Mohammed Ghayour
*Assistant Examiner*—Pankaj Kumar
(74) *Attorney, Agent, or Firm*—Farjami & Farjami LLP (57) ABSTRACT

The present invention is directed to a method and system for operating a secondary diagnostic channel on a modem. The present invention is directed to the transmission of data on a previously defined UI frame. In this manner, various pieces of information may be sent over the secondary logic channel. The present application also discloses the use of a wild card request that allows the sending of multiple pieces of unrelated data at one time, through the use of a special format. The present application also discloses the use pseudo-unique call identification information that can be used to diagnose and prevent problems in various data connections. Modems can be configured to refer to information stored for previous connections to diagnose problems that may have occurred in the previous connection.

41 Claims, 6 Drawing Sheets

| OPEN_FLAG | DLCI | UI_CONTROL | UI_TYPE | UI_INFO | CRC | CLOSE_FLAG |
|---|---|---|---|---|---|---|
| Flag | Standard Address Field | Stadard UI Control Field | First byte of Information field | Remaining Information Field (Secondary Channel Frame) | Checksum (CRC-16) | Flag |
| 1 byte | 1 byte | 1 byte | 1 byte | Up to 248 bytes | 2 bytes | 1 byte |

MODEM IDENTIFICATION AND DIAGNOSTICS

This application is a continuation-in-part of U.S. utility patent application Ser. No. 09/662,405, filed Sep. 14, 2000 now U.S. Pat. No. 6,980,590, which claims the benefit of U.S. provisional application No. 60/153,897, filed Sep. 14, 1999.

BACKGROUND OF THE INVENTION

1. Technical Field

Figure 1:
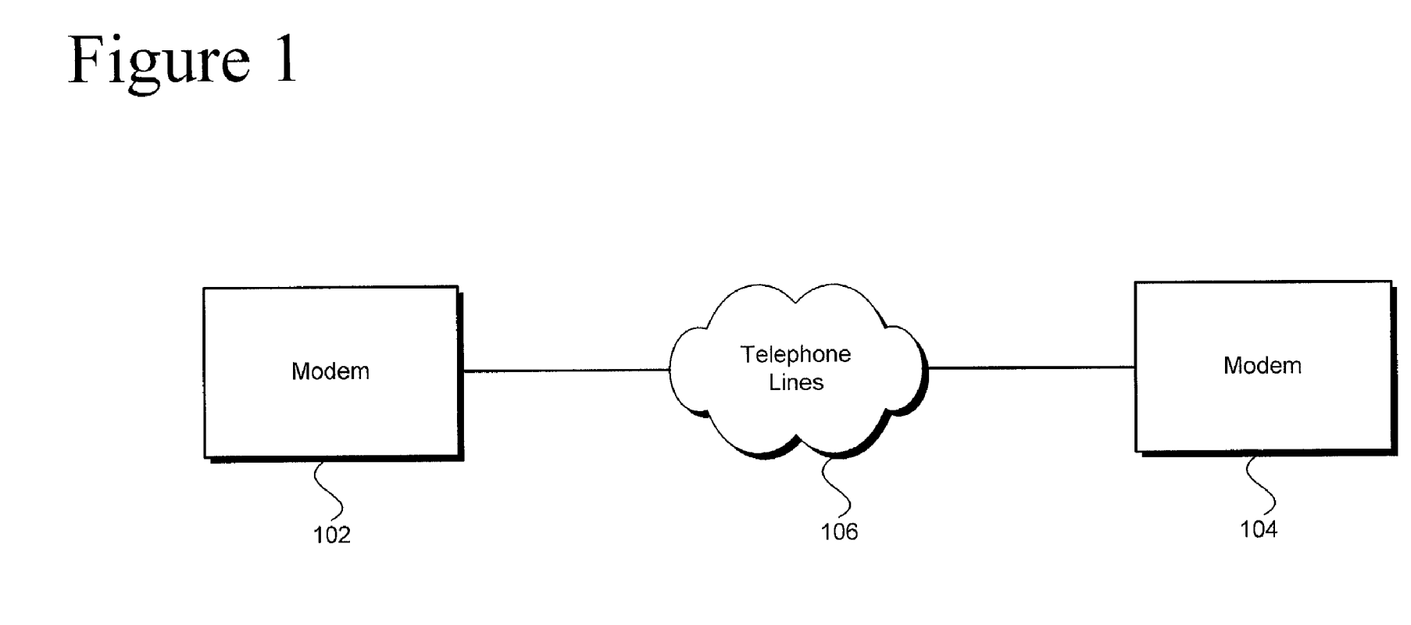
FIG. 1 depicts a typical connection between two modems.

With reference to FIG. 1, a typical analog modem system is presented. A modem 102 connects to another modem 104 via telephone lines 106 to transmit and receive information. In order for the modems to communicate with each other, each modem must first determine the type of modem with which it is attempting to communicate, in order to, inter alia, transmit data at an optimum rate.

Figure 4:
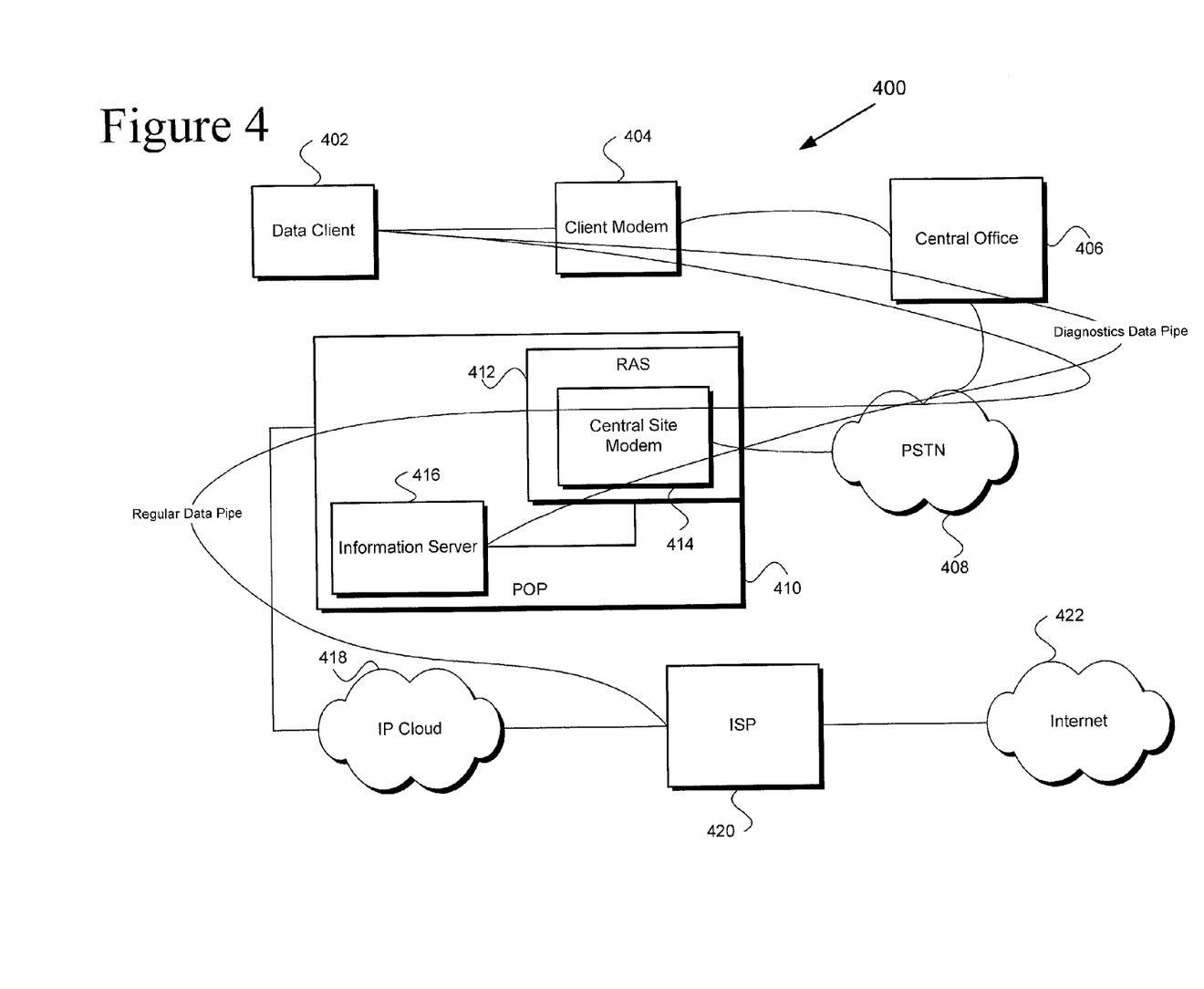
FIG. 4 depicts a typical connection between a data client and an internet service provider.

More particularly, with reference to FIG. 4, a typical connection between a data client 402 and the Internet 422 is depicted. Data client 402 is typically a computer that is coupled to a modem 404. In order to connect to the Internet 422, data client 402 is coupled to an Internet Service Provider ("ISP") 420. Point of presence 410 is used to interface between ISP 420 and modem 404. Located within point of presence 410 is a remote access server ("RAS") 412 that contains a central site modem 414. Central site modem 414 is coupled to an IP cloud 418 that sends and receives data, in packet form, to and from ISP 420. RAS 412 is also coupled to an information server 416 that serves to control RAS 412.

Data traditionally follows a path from modem 404, through the public switched telephone network ("PSTN") 408, to point of presence 410. RAS 412 (within point of presence 410) sends and receives data, in packet form, through IP cloud 418 to ISP 420, thereby connecting data client 402 to the Internet 422.

There may be situations in which ISP 420 does not own or control point of presence 410, but rather contracts with, e.g., a regional service provider that owns or controls point of presence 410. In this situation, the regional service provider may be paid on the basis of call connection percentage. Therefore, it would be desirable for the regional service provider to be able to diagnose problems on the telephone lines to improve the call connection percentage. It may be necessary to gather information from modem 404 in order to gather the appropriate data. However, there is no means within point of presence 410 that would enable the gathering of such information. It would be desirable to establish a private data channel between modem 404 and information server 416 in order to gather such data.

For a number of reasons, it may also be desirable to enable one modem device to identify itself to another modem device during the modem initialization process such that, if the devices are compatible with each other, a number of enhanced features can be prompted or employed. The use of such differentiated features may allow certain compatible modem devices to operate in an improved manner, relative to incompatible modem devices. However, the standard handshake sequences used by two modem devices to establish communications have only a limited capability to exchange manufacturer-specific information for system identification, configuration, and diagnostics.

The conventional V.8bis handshake sequence provides some capability to exchange system-specific information during the initial handshake procedure. For example, some modem manufacturers use the V.8bis handshake sequence to exchange limited diagnostic and identification information. This exchange is only available at the beginning of a call, however, because manufacturers generally do not wish to prolong the handshake sequence. Using the handshake sequence to exchange diagnostic and identification information is generally undesirable, as the user would be forced to wait longer for a connection to be established. In addition, during the handshake sequence, data is being transmitted at a relatively low rate because, until the modems determine the type of modem with which it is communicating, the modems cannot transmit at their maximum speed. Therefore, it may not be desirable to transmit a large amount of data before the handshaking sequence is completed and a data channel is opened that operates at a faster speed.

The manner in which the modem devices exchange the identification data and the type of data exchanged can be varied to address a number of practical issues, e.g., improved performance at a central site ISP location; improved diagnostic information available to the central site ISP location; as well as differentiated features that may be developed in the future. The performance associated with a central site may be related to the number of unintentional call disconnections, the number of calls that progress beyond the initial handshaking procedure, the data rates obtained during the connections, and other functional aspects of the modem connections established through the central site.

During the handshaking procedure, while it may be desirable to exchange as much information as possible for diagnostic and identification reasons, such an exchange should consider the duration of the handshake sequence: it is typically undesirable to significantly lengthen the duration of the handshake sequence. Furthermore, the transmission of diagnostic data and identification information should be transparent to the user. In addition, it is desirable to identify the client modem very early in the handshake sequence so that the central site modem is can capture information and utilize the information to help diagnose and address connectivity problems in the field. It is thus desirable for a modem to have a short handshake period along with full-featured end-to-end diagnostics. It would be desirable to enhance the ability of the modem devices to exchange such information, without burdening the initial handshake and thereby delaying the time needed to establish a connection. In addition, it may be desirable to establish a communications channel between modem devices that is available throughout the call, not just at the beginning of the call. Furthermore, it may also be desirable for modem devices to be able to compare diagnostic information from a previous connection with diagnostic information from a connection between the same devices at a later time.

SUMMARY OF THE INVENTION

The present invention is directed to a method and system that satisfies the above-described needs. A method having features of the present invention includes connecting two modems with each other. Then a handshaking sequence may be performed and identification data may be transmitted between the modems. A primary data channel is opened between the two modems. During the handshaking sequence, the modems also indicate the ability to use a secondary, diagnostic channel.

A method having features of the present invention includes connecting two modems with each other. A unique or pseudo-unique identifier is created and stored for each particular connection. The identifier can be used by server-side modems to determine the reliability and connection percentage of a particular modem.

The pseudo-unique identifier may be used by a first modem transmitting the identifier of a previous connection over the communications channel to a second modem. Then the second All modem can match the pseudo-unique call identification information with previously stored call identifiers, thereby enabling the comparison of diagnostic information concerning the previous with other diagnostic information.

An embodiment of the present invention operates by opening a primary data channel for the transmission of data while transmitting diagnostic data on a secondary channel. The secondary channel may be configured to operate using UI frames.

Another embodiment of the present invention operates by using a secondary communications channel. First, the modems indicate the format of the diagnostic information being sent. Then diagnostic information can be transmitted on the secondary communications channel. The diagnostic information contains information in multiple categories.

Various data, including the data listed above, may be transmitted on a second logical channel that may be opened after or while a primary data channel is opened. The second logical channel may be configured such that the second logical channel is used only when the two modems are not using the primary data channel to full capacity. The second logical channel may be an alternate usage of an already existing feature set.

BRIEF DESCRIPTION OF THE DRAWINGS

The invention is further described in connection with the accompanying drawings, where like reference numbers depict like elements, in which.

DETAILED DESCRIPTION

Figure 2:
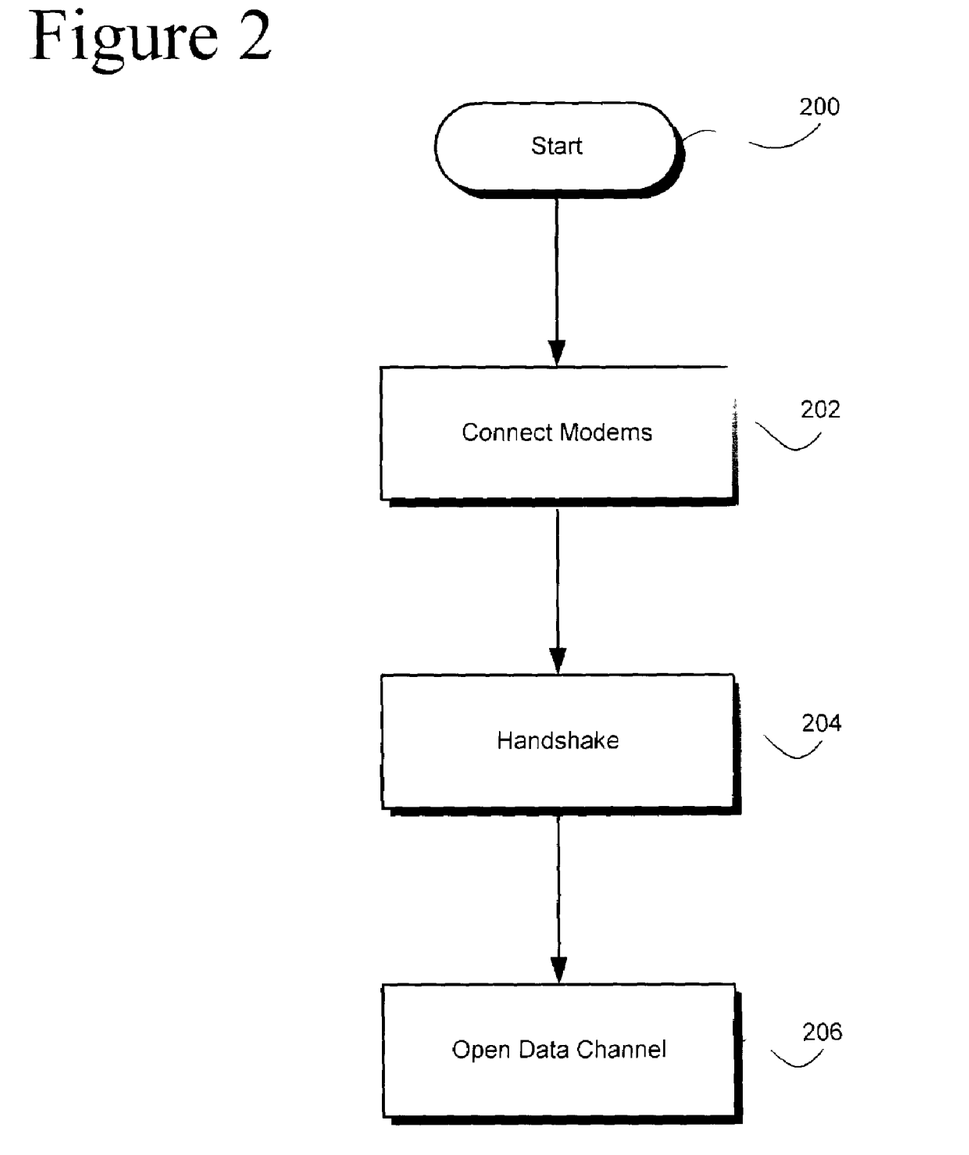
FIG. 2 shows a flow chart of the connection procedure as described in this application.

FIG. 2 is a flowchart illustrating the operation of modem system of the present invention. Two modems are connected to each other (step 202). Typically, this connection step is accomplished when a second modem dials a phone number that is answered by a first modem. The first modem may belong to a Network Service Provider ("NSP"), a Regional Service Provider ("RSP"), or an Internet Service Provider ("ISP"), although the first modem may be operated by any number of people or entities. The modems then perform a handshaking step in which the modems exchange various information (step 204). After the handshaking is complete, normal operation of the modem continues by opening a data channel at an optimum speed, enabling both the first and second modems transmit and receive data (step 206)

The handshaking step (204) may be accomplished by using existing V.8bis or other mechanisms (e.g., a combination of V.8bis, V.8, V.25, and/or other features associated with conventional data communication protocols): the client and central site modems may indicate that they are compatible with certain specifications, features, or the like. In addition, the modem devices may exchange an amount of data (e.g., 4 bytes (32 bits) of information) that contains an identification of certain types of data, such as:

a) A Platform Identifier;
b) A Controller Revision (if applicable);
c) A DSP Revision; or
d) A Firmware Revision.

Both modem devices may transmit a suitable amount of identification data to each other in a bi-directional manner. The identification data may be encoded in accordance with any number of coding algorithms. It should be noted that all of the above-described information may be transmitted, received, and processed without any specific involvement of the end users. The capture of this information during the early part of the handshake can be very helpful in identifying and diagnosing connectivity problems, particularly in connections that fail before communication protocols such as V.42 can be established. It also enables the ISP, RSP, or NSP to determine if the client modem requires a code update by analyzing any revision data contained in the exchange.

One potential problem that may occur is that non-compatible modems might choose to copy the specific identification codes (or the encoding algorithm) without realizing that such codes may impact the identification process associated with compatible modems. This could lead to misidentification of clients in the field, or misattribution of connectivity problems. One possible solution that could address this concern is to have the central site modem transmit a pseudo-randomly generated code word that is different on each call during the V.8bis exchange. The client modem could run the received code word through a predetermined scrambler and transmit it back to the central site. The central site would compare the received code word with what it expects to receive. While it is possible for non-compatible modem manufacturers to discover such encoding techniques, such a discovery would not be easy and would be a time consuming effort. Indeed, the scrambler polynomial and the operation of the identification coding need not be publicized.

The mere exchange of identification data can be useful for diagnostic and statistical reasons, even if the call is not eventually established. In other words, it may be desirable to obtain and analyze information related to the type, revision, and model of the modems that have performed such an initialization procedure, regardless of whether the modem devices progress to the data mode. Also, once the two modems know that they are compatible with each other, they may attempt to leverage this information throughout the call by, e.g., transmitting the data in a particular format that is unique to the compatible modems.

One other piece of information that may be useful is the transmission of pseudo-unique call identification information, also known as a "call cookie." During a call, diagnostic information regarding the call can be gathered and stored. In addition, a call identifier can be created and stored. This call identifier may be a random or pseudo-random string generated by either client modem 402 or central site modem 414. In the alternative, the call identifier may be a pseudo-unique string, e.g., the serial number of a modem (which is unique to that particular modem) combined with the date and time of the call. As long as each call can be identified in a reasonably unique manner, the manner of making such an identification is irrelevant. It should be understood that the phrase "pseudo-unique" also includes unique strings. The string may comprise alphanumeric characters. The string may also include control characters or other non-printable characters. If, during a subsequent call between the same modems, the call is not successfully completed, the information regarding successful calls and unsuccessful calls can be compared.

The identifier can be used in several different manners. For example, the modems may only store the identifiers of connections that failed. Thereafter, during a subsequent connection, the client modem may inform the server modem of the call identifier of a previous failed connection. The server modem can locate the same pseudo-unique call identifier, then the diagnostic information about the previous call can be analyzed to attempt to determine the cause of the failed connection. In addition, the diagnostic information about the previous call can be compared with the diagnostic information regarding the present call, or even other previous calls, in an attempt to determine the cause of the failed connection.

The central site modems may use this information to determine if its modems are operating properly. This information may also be used to determine if a specific combination of line, modem, and service conditions cause performance or connectivity issues. Isolating the connection to specific modems and line conditions can provide valuable information in diagnosing and debugging performance and connectivity issues.

This information can also be used to prevent future connectivity problems. For example the modems can be configured to forward data to the modem manufacturer regarding failed connections. In this manner, the modem manufacturer can determine conditions likely to result in a connection failure. To provide more detailed information, instead of merely storing information regarding the failed calls, the server modem could store information regarding all connections or a statistical sample of all connections. By doing this, a modem manufacturer would be able to compare the differences between failed connections and successful connections. The manufacturer would then be able to use the information to provide improvements or upgrades to its products in the hopes of alleviating the problems.

Background Channel after Handshake

ITU-T Recommendation V.42 contains provisions for a second logical channel, but does not designate what such channel can be used for. Although V.42 relates to error correction techniques, the second logical channel of V.42 may be utilized in an unrelated manner as a background maintenance/diagnostic channel by which the client and central site modems can have a proprietary dialogue. Additionally, existing features in a single V.42 channel can be used to set up a virtual second channel without completely duplicating an entire V.42 session. This virtual channel can also be used as a conduit for maintenance and diagnostic information. As the end-users are not typically transmitting at maximum rates during the beginning (or even the middle) of a call, there should be sufficient bandwidth for a diagnostic exchange to occur in the background without impacting the end users' call setup or use experience. In addition, the second logical channel may be used throughout the duration of a call.

In one embodiment, the second logical channel could have a lower priority than user data, in the presence of customer data, such that there is no apparent effect on the flow of user data. If no unexpected barriers arise, the second channel could be used to transmit a wide variety of data, including, but not limited to, the following:

a) Customer platform identifier;
b) Customer code revision Identifier;
c) Modem initialization strings, or other configuration information;
d) Remote Query by the central site of client AT command responses;
e) Remote query by the central site of the client for client status outside of standard AT commands through a proprietary diagnostic query/response mechanism;
f) Software and driver upgrades; or
g) pseudo-unique call identification information and associated data.

The operation of an embodiment of the present invention is as follows. At the initialization of a phone call, the V.42 standard provides for the exchange of information through XID frames. An embodiment of the present invention uses XID frames to transmit data indicating that the call originator, typically the data client, is capable of utilizing a secondary data channel. If the answering modem also supports the secondary data channel, the secondary data channel may be established.

In a typical modem connection, information frames ("I frames") are exchanged which contain data in the traditional data pipe. As is known in the art, this data is acknowledged through the use of I frames or RR frames. In the traditional data pipe, two Unnumbered Information ("UI") frames are defined, Break and BreakACK, but are rarely used. The format of such a UI frame is shown in FIG. 5.

An embodiment of the present invention uses a newly defined UI frame: the secondary or diagnostic frame. This frame is interrupted by central site modem 414. Rather than being sent over the regular data pipe to IP cloud 418 and ISP 420, the frame is sent via a separate control channel to information server 416. This action is transparent to the higher layer protocols running over the regular data pipe. Thus, a second data channel is created at the link layer. This channel resides at or above Layer 1, but below layer 4, which allows the creation of an information pipe between two communication entities that is transparent to Layer 7 applications on either side of the communications pipe. (The seven layers model of OSI is known in the art and comprises the following layers: 1. Physical Layer; 2. Data Link Layer; 3. Network Layer; 4. Transport Layer; 5. Session Layer; 6. Presentation Layer; and 7. Application Layer). Other embodiments may allow the channel to reside at any layer lower than the one to which the diagnostic channel must remain transparent.

In an embodiment of the present invention, during V.42 negotiations, a modified XID frame is transmitted. The XID frame includes a "User Data" subfield which includes a "Manufacturer ID" parameter. The value of this parameter can be an ASCII string indicating support for the secondary logic channel. In a preferred embodiment, the ASCII string is the 5 characters "V42DC" (meaning V.42 Diagnostic Channel), followed by a two-byte value indicating the version of the diagnostic channel that is supported by the modem. The originator XID frame will contain this parameter if the originating modem desires a secondary logic channel. The answerer XID frame will contain this parameter if it is also willing to support a secondary logic channel for this session. Then the exchanged version numbers will indicate to the modems which version of the secondary logic channel is to be used.

Figure 5:
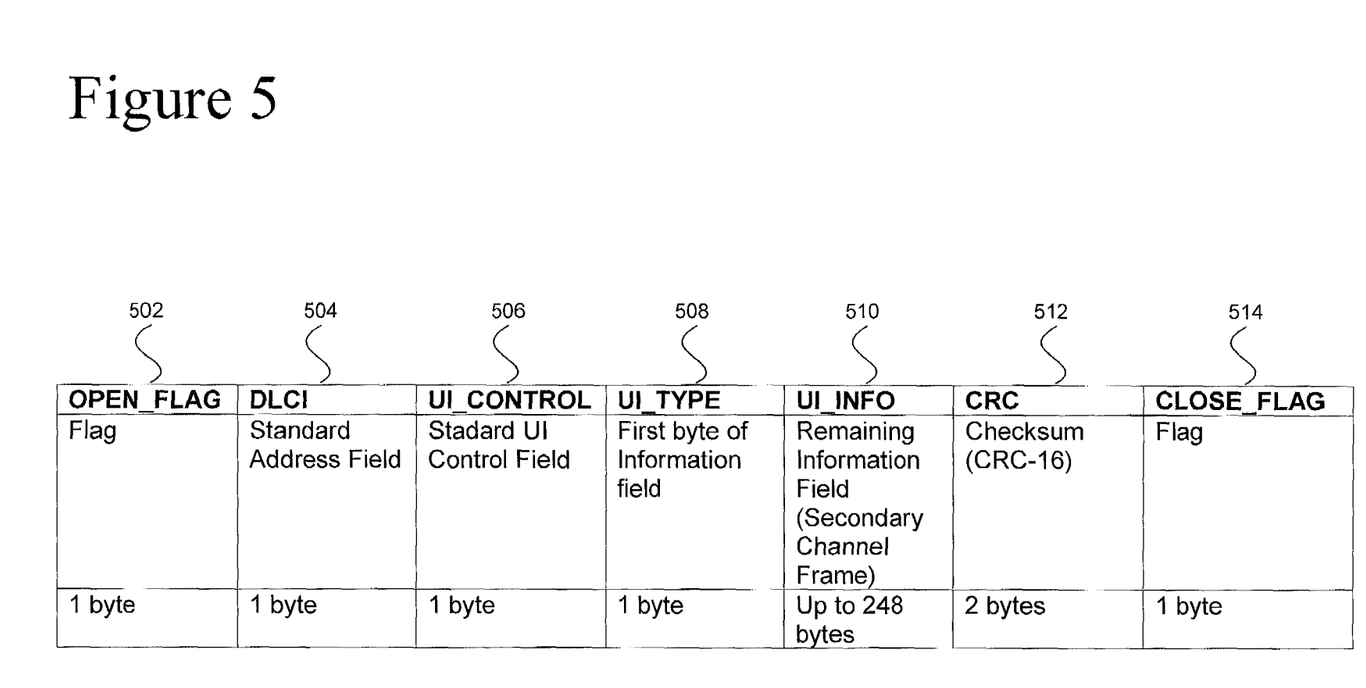
FIG. 5 depicts the format of a secondary channel UI frame.

With reference to FIG. 5, once a secondary logic channel is opened, data on the secondary logic channel may be transferred as Unnumbered Information ("UI") frames. A UI frame contains several fields: OPEN_FLAG field 502;

DLCI field 504; UI_CONTROL field 506; UI_TYPE field 508; UI_INFO field 510; CRC field 512; and CLOSE_FLAG field 514. UI_TYPE field 508 is used to identify the type of UI frame. The two types defined in the existing revision (October 1996) of the V.42 specification are Break, with a value of 0x40 and BreakACK, with a value of 0x60. In a preferred embodiment, the new UI frame code value will be 0x10. When UI_TYPE field 508 has a value of 0x10, then UI_INFO field 510 contains the information to be transmitted by the UI frame as the secondary logic channel.

Figure 6:
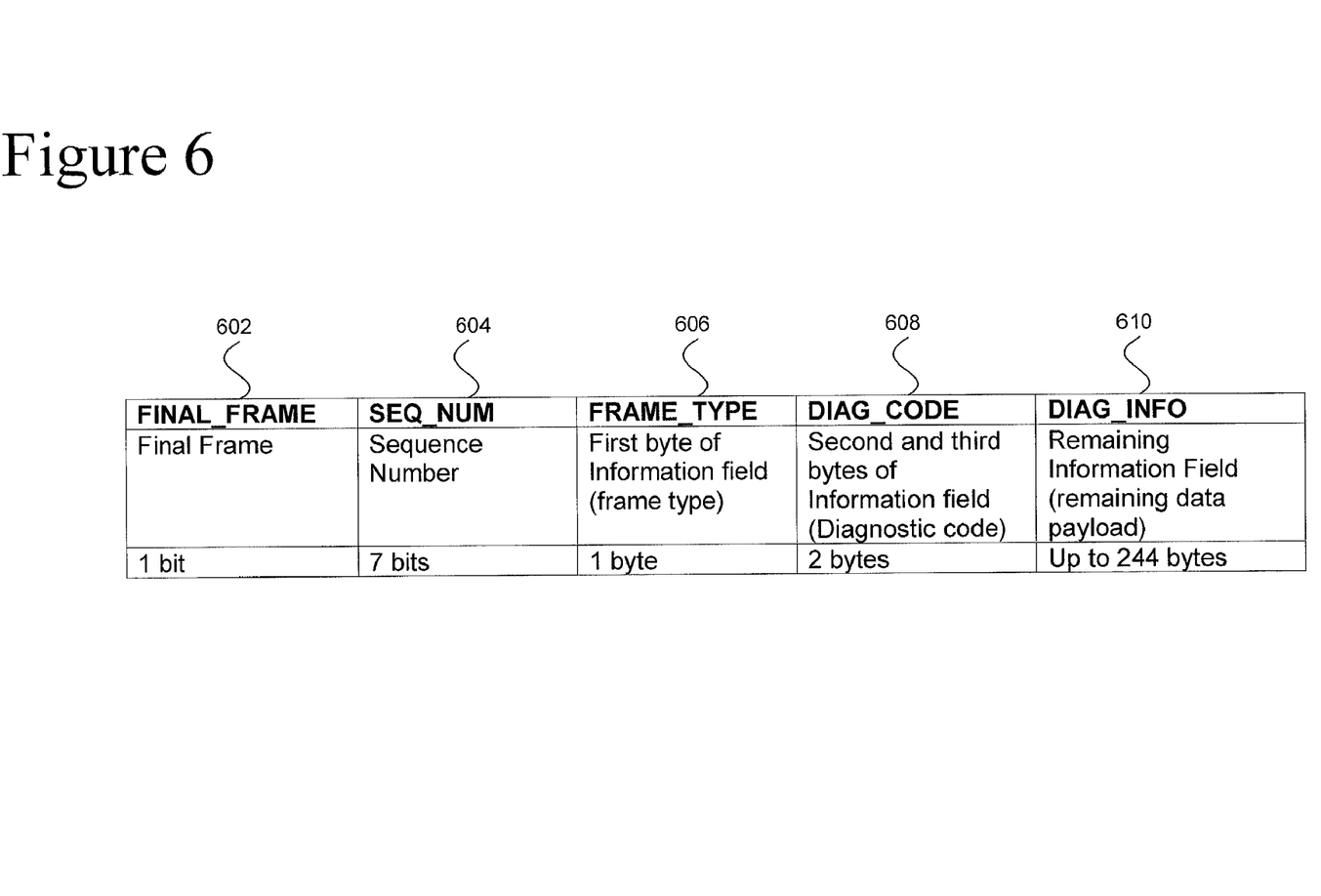
FIG. 6 depicts the format of a diagnostic channel frame.

With reference to FIG. 6, the data contained in UI_INFO field 510 in a preferred embodiment of the present invention is disclosed. FINAL_FRAME 602 is a single bit that indicates whether or not all of the requested information is present in the frame: if a large amount of information is to be transmitted, transmission along more than one frame may be necessary. SEQ_NUM 604 is a 7-bit field. Command frames from each end will have sequentially increasing sequence numbers modulo 128. Response frames typically contains the sequence number as the corresponding command frame. FRAME_TYPE 606 is a 1-byte field that contains the first byte of the information field. Diagnostic channel frames typically fall into one of two categories: either a command frame or a response frame. A command frame is a frame that indicates a request from one modem to another. A response frame contains the data requested by a corresponding command frame. There may be several different types of command frames. In a particular embodiment, a value of 0x00 in FRAME_TYPE field 606 indicates that the frame contains a request from the remote end for information; a value of 0x01 indicates that the frame contains a request for action to be taken at the remote end; a value of 0x02 indicates that the frame contains a request to reconfigure the remote end; a value of 0x03 indicates that the frame contains unsolicited information to be sent to the remote end; and a value of 0x04 indicates that the frame contains data or an acknowledgement which is being sent in response to any command frame. DIAG_CODE 608 is a two-byte field wherein the value of the word indicates the piece of diagnostic information being sent or requested. The values of the fields may be mapped in a number of different manners.

In addition, a value of 0xFFF in the DIAG_CODE field may be defined as a "wild card" request. Response frames preferably contain the same Diag_code as the original command frame. DIAG_INFO field 610 is variably sized from 0 to 244 bytes and contains the data containing the diagnostic information. A frame of type Monitor will typically have an empty DIAG_INFO field 610, as will frames of type Control or Config. A frame of type Unsolicited preferably contains data in DIAG_INFO field 610. A frame of type Response will also preferably contain data in DIAG_INFO field 610.

As discussed above, a wild card monitor frame is available by placing 0xFFFF in DIAG_CODE field 608. In this case, DIAG_INFO field 610 would then contain a list of diagnostic codes that corresponds to a piece of diagnostic codes. The Response frame to this Monitor frame will then have the same Wildcard diagnostic code of 0xFFFF in DIAG CODE field 608 and will have a DIAG_INFO field 610 that contains all the values of all the diagnostic items that were requested. The items may be delineated through the use of the 2-byte Diagnostic code to which the item relates followed by the length of the data item (typically in a 2-byte field). In such a case, the Diagnostic code and length indication may be interlaced such that there is a Diagnostic code and length indication between each piece of diagnostic information. The set of information that can be exchanged through the diagnostic channel may include items listed in the V.42 Diagnostic Channel Code Points Specification. Thus, rather than sending diagnostic information in separate frames for each requested field of information, information in a plurality of different fields is sent in one frame, resulting in a time savings because of the reduced overhead for sending one frame compared to sending multiple frames.

In the event that the information being sent over the secondary/diagnostic channel does not fit into DIAG_INFO field 610 (i.e., the information is longer than 244 bytes), the information can be split into two or more UI frames with the use of FINAL_FRAME 602.

Another possible approach is the support of standard AT commands. In conventional modem systems, AT commands originate with an end user, as central site modems are typically not capable of requesting diagnostic information from the client modems. The second logical channel could be utilized to enable the central site modems to specifically query the client modem device using AT commands, without interrupting the data mode. In the alternative, a proprietary diagnostic query/response mechanism may be used to transmit the data. In a similar manner, the client modem can also receive information from the server, such as a firmware revision or a patch to fix a bug.

Since an end user typically does not transmit much data at the beginning of a call in the upstream direction (i.e., from a client site to a central site modem), it is feasible for the client modem to send a "data dump" of desirable information (e.g., manufacturer identification, initiation and dial strings used, status of call waiting disabling, or the like) in the upstream direction. If this information is encoded in a second logical channel, and if the central site modem device properly strips out the second channel, the central site modem can gather this information and route it to higher protocol layers within the remote access server. This information can be utilized for improved remote modem management, among other things. In addition, this information is essentially a private communication between the communication entities and is transparent to the overlying data being transported between the two applications operating on either end of the communication link.

The present invention is not limited to any specific types or forms of data that may be conveyed by the second logical channel, or the manner in which such data is used by the modem system. In a preferred practical embodiment, the second channel may be used for diagnostics, remote network management, platform/model identification, or system configuration data.

One possible implementation is to have the central site modem use the second logical channel to send an AT command downstream to the client modem. The client could then transmit its response to the command upstream to the central site modem, via the second logical channel. If the user desires to send information upstream, then such transmission may take precedence over the second logical channel, because the secondary logic channel is given lower priority. Accordingly, the present invention may be implemented without any noticeable effect or disruption to the client user because the secondary logic channel is only used when the overall data channel has excess capacity.

Figure 3:
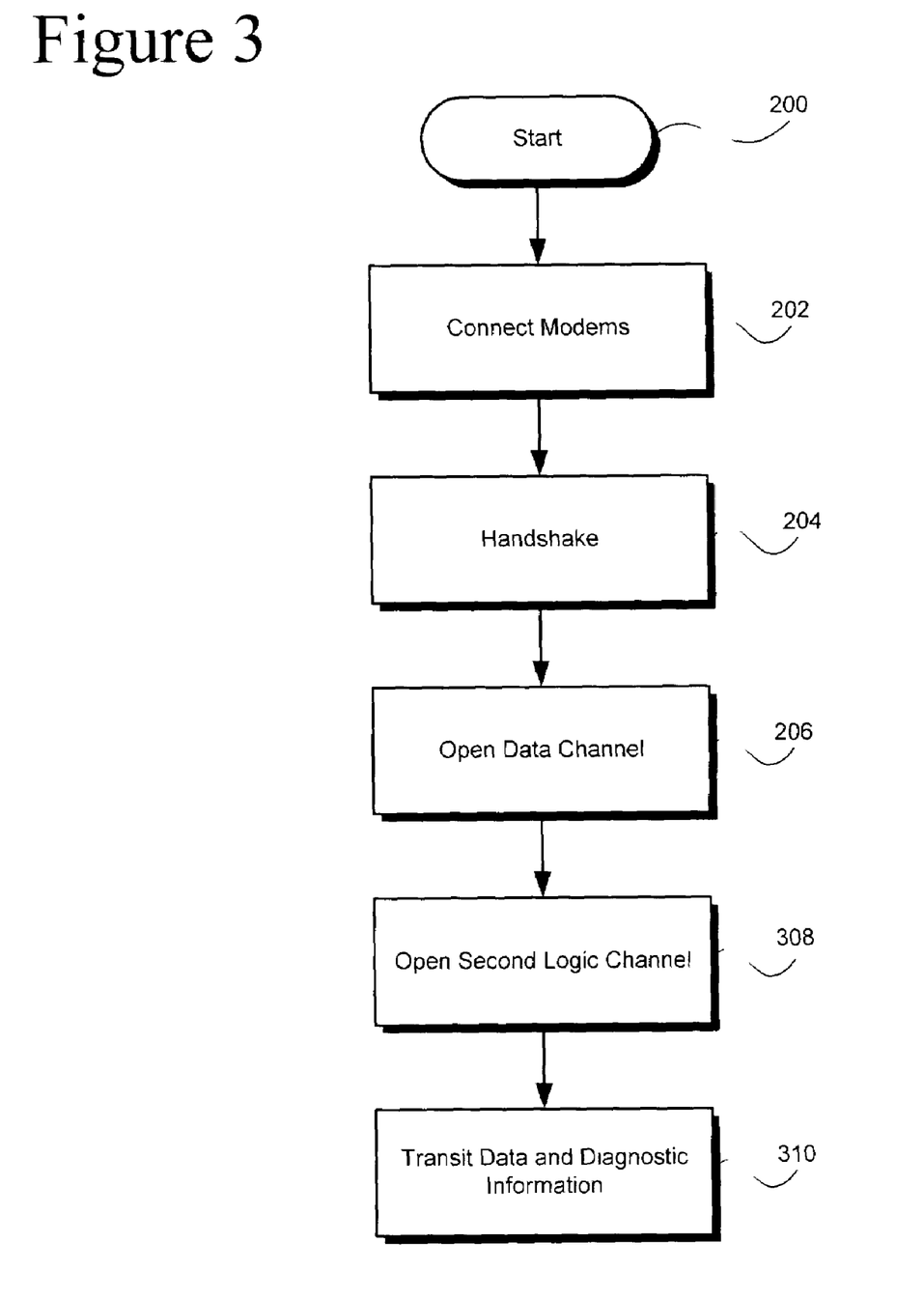
FIG. 3 shows a flow chart of the connection procedure of another embodiment described in this application.

The operation of this embodiment is illustrated in FIG. 3. Following connection step 202, handshaking step 204, and opening data channel at step 206, step 308 opens a secondary logic channel, followed by step 310 in which normal operation of the modem system continues, with data being transmitted on both the primary data channel and the secondary logic channel.

Another possible use of the secondary logic channel is to uniquely or pseudo-uniquely identify each call through the use of a call cookie. This may be a random or pseudo-random number generated by either the client or the central site modem. This number is associated with the line, time of day, duration, amount of information transmitted and received, and the identification of the modems through database techniques well known in the art. This identifier may be transmitted through the secondary logic channel at some point during the call. The central site modems may use this information to determine if their modems are operating properly. This information may also be used to determine if a specific combination of line, modem, and service conditions cause performance or connectivity issues. Isolating the connection to specific modems and line conditions can provide valuable information in diagnosing and debugging performance and connectivity issues.

In summary, the use of the V.42 second logical channel can provide a richer and more flexible communication channel than that used during the conventional V.8bis exchange. The second logical channel contemplated by the present invention may be available throughout the duration of the call rather than being restricted to the beginning of the call. The second channel need not interfere with the data being transmitted and received by the end user, because the diagnostic or management data transmitted over such second channel may be designated with a lower priority than user data. The second channel is transparent to higher layer applications which traditionally rely on the reception and transmission of TCP/IP packets, because the channel is implemented at a lower layer in the communications stack, in this case, just above the Link layer (Layer 2). In addition, the benefits of the present invention may be realized without purchasing or deploying a complicated "modem management" application.

In conclusion, it should be appreciated that the description of the present invention herein pertains to preferred embodiments and that the concepts of the invention may be extended to other practical applications. In addition, it should be understood that, although this invention is invention is described in the context of analog, not limited to analog, land line modem system, the invention is not so limited. The methods and system described in this specification may be used in some wireless systems and can be adapted for use in any communications system. In addition, the current V.8, V.8bis, and V.42 Recommendations, along with any related appendices and attachments, are incorporated by reference herein.

We claim:

1. A method of identifying a connection between a first data entity and a second data entity, said method comprising:
    initiating one or more calls for establishing a connection between said first data entity with said second data entity;
    creating a pseudo-unique identification code that is different for each of said calls;
    storing said pseudo-unique identification information for each of said calls;
    storing diagnostic information relating to each of said calls;
    associating said diagnostic information for each of said calls with said pseudo-unique identification code corresponding to each of said calls;
    wherein storing said diagnostic is only performed for each of said calls that results in a failed connection.

2. The method of claim 1 wherein said pseudo-unique identification information comprises a string that is pseudo-randomly generated.

3. The method of claim 1 wherein said storing said pseudo-unique identification information occurs on both said first data entity and said second data entity.

4. The method of claim 1 wherein said first data entity comprises a first modem and said second data entity comprises a second modem.

5. A method of communicating between a first modem and a second modem comprising:
    opening a primary data channel between said first modem and said second modem; and
    transmitting diagnostic/maintenance data on a secondary logic channel;
    wherein said transmitting comprises placing a value of 0x10 in the UI-TYPE field of an Unnumbered Information frame and placing said diagnostic/maintenance data in the UI_INFO field of the Unnumbered Information frame.

6. The method of claim 5 further comprising:
    determining the capabilities of said first modem and said second modern before said transmitting step; and
    optimizing said secondary logic channel based on said determining step.

7. The method of claim 5 wherein the UI_INFO field comprises information in one or more of the following categories: FINAL_FRAME; SEQ_NUM FRAME_TYPE; DIAG_CODE and DIAG INFO.

8. The method of claim 5 further comprising:
    sending a request from said first modem to said second modem via said secondary logic channel; and
    transmitting data in response to said request from said second modem to said first modem via said secondary logic channel.

9. A method of using a secondary communications channel by a first modem in communication with a second modem comprising:
    receiving second modem identification data from said second modem;
    indicating that diagnostic information will be in a certain format; and
    sending said diagnostic information on said secondary communications channel in response to said second modem identification data;
    wherein said diagnostic information contains information in a plurality of different areas.

10. The method of claim 9 wherein said diagnostic/maintenance information further comprises pseudo-unique identification information.

11. The method of claim 10 wherein said diagnostic/maintenance information further comprises information regarding the quality of the connection between said first modem and said second modem.

12. The method of claim 10 said diagnostic information is interlaced with indications of the area of said information.

13. A method of using call identification information by a first modem, said method comprising:
    establishing a first connection with a second modem;
    creating a first call identification information unique to said first connection;
    storing said first call identification information for said first connection;
    storing first diagnostic information relating to said first connection;

associating said first diagnostic information with said first call identification information; terminating said first connection;
establishing a second connection with said second modem;
creating a second call identification information unique to said second connection;
receiving a call identification information for a previous connection from said second modem;
matching said call identification information with said first call identification information stored by said first modem;
retrieving said first diagnostic information associated with said first call identification information.

14. The method of claim 13 wherein said receiving is performed through the use of a secondary data channel.

15. A data communication method for use by a first modem in communication with a first system and a second system, said method comprising:
starting a physical connection process with a second modem over a communication line;
receiving second modem identification data from said second modem;
completing said physical connection process, after said receiving, to establish a data communication session with said second modem;
establishing an error corrected data channel over said communication line with said second modem;
establishing a non-error corrected data channel over said communication line with said second modem in response to said second modem identification data;
receiving information data from said second modem over said error corrected data channel;
transmitting said information data to said first system;
receiving diagnostics data from said second modem over said non-error corrected data channel; and
transmitting said diagnostics data to said second system.

16. The method of claim 15 further comprising: transmitting first modem manufacturer identification data to said second modem prior to said completing.

17. The method of claim 15, wherein said error corrected data channel and said non-error corrected channel are provided based on V.42 Recommendation.

18. The method of claim 15, wherein said diagnostics data are received via unnumbered information frames.

19. The method of claim 18, wherein each of said unnumbered information frames includes a diagnostics type field.

20. The method of claim 18, wherein each of said unnumbered information frames includes a frame type field indicative of a response frame or a command frame.

21. The method of claim 18, wherein each of said unnumbered information frames includes a diagnostics code field.

22. The method of claim 18, wherein each of said unnumbered information frames includes a diagnostics information field.

23. The method of claim 15, wherein said second modem identification data includes manufacturer identification data.

24. The method of claim 15, wherein said second modem identification data includes a call identifier created based on a previous call.

25. A first modem capable of communicating with a first system and a second system, said first modem comprising:
a handshaking module configured to start a physical connection process with a second modem over a communication line;
a receiver configured to receive second modem identification data from said second modem, wherein said handshaking module completes said physical connection process after said receiver receives said second modem identification data to establish a data communication session with said second modem; and
a processor configured to establish an error corrected data channel and a non-error corrected data over said communication line with said second modem in response to said second modem identification data;
wherein said processor receives information data from said second modem over said error corrected data channel and transmits said information data to said first system, and wherein said processor receives diagnostics data from said second modem over said non-error corrected data channel and transmits said diagnostics data to said second system.

26. The first modem of claim 25, further comprising: a transmitter configured to transmit first modem manufacturer identification data to said second modem prior to completing said physical connection process.

27. The first modem of claim 25, wherein said error corrected data channel and said non-error corrected channel are provided based on V.42 Recommendation.

28. The first modem of claim 25, wherein said diagnostics data are received via unnumbered information frames.

29. The first modem of claim 28, wherein each of said unnumbered information frames includes a diagnostics type field.

30. The first modem of claim 28, wherein each of said unnumbered information frames includes a frame type field indicative of a response frame or a command frame.

31. The first modem of claim 28, wherein each of said unnumbered information frames includes a diagnostics code field.

32. The first modem of claim 28, wherein each of said unnumbered information frames includes a diagnostics information field.

33. The first modem of claim 25, wherein said second modem identification data includes manufacturer identification data.

34. The first modem of claim 25, wherein said second modem identification data includes a call identifier created based on a previous call.

35. A data communication method for use by a first modem in communication with a first system, a second system and a second modem, said method comprising:
receiving second modem identification data from said second modem;
establishing an error corrected data channel with said second modem;
establishing a non-error corrected data channel with said second modem in response to said second modem identification data;
receiving information data from said second modem over said error corrected data channel;
transmitting said information data to said first system;
receiving diagnostics data from said second modem over said non-error corrected data channel; and
transmitting said diagnostics data to said second system.

36. The method of claim 35, wherein said error corrected data channel and said non-error corrected channel are provided based on V.42 Recommendation.

37. The method of claim 35, wherein said diagnostics data are received via unnumbered information frames.

38. The method of claim 37, wherein each of said unnumbered information frames includes a diagnostics type field.

39. The method of claim 37, wherein each of said unnumbered information frames includes a frame type field indicative of a response frame or a command frame.

40. The method of claim 37, wherein each of said unnumbered information frames includes a diagnostics code field.

41. The method of claim 35, wherein each of said unnumbered information frames includes a diagnostics information field.

* * * * *

UNITED STATES PATENT AND TRADEMARK OFFICE
CERTIFICATE OF CORRECTION

PATENT NO. : 6,996,167 B2
APPLICATION NO. : 09/824448
DATED : February 7, 2006
INVENTOR(S) : Eldumiati et al.

Page 1 of 1

It is certified that error appears in the above-identified patent and that said Letters Patent is hereby corrected as shown below:

Claim 6, column 10, line 25, "modern" should be changed to --modem--.

Signed and Sealed this

Twelfth Day of September, 2006

JON W. DUDAS
*Director of the United States Patent and Trademark Office*